L. W. CHUBB.
ELECTROLYTIC CELL.
APPLICATION FILED APR. 4, 1917.

1,348,207.

Patented Aug. 3, 1920.

WITNESSES:
Fred H. Mill
R. D. Brown

INVENTOR
Lewis W. Chubb
BY
Wesley G. Carr
ATTORNEY

UNITED STATES PATENT OFFICE.

LEWIS W. CHUBB, OF EDGEWOOD PARK, PENNSYLVANIA, ASSIGNOR TO WESTINGHOUSE ELECTRIC & MANUFACTURING COMPANY, A CORPORATION OF PENNSYLVANIA.

ELECTROLYTIC CELL.

1,348,207.   Specification of Letters Patent.   Patented Aug. 3, 1920.

Application filed April 4, 1917. Serial No. 159,657.

*To all whom it may concern:*

Be it known that I, LEWIS W. CHUBB, a citizen of the United States, and a resident of Edgewood Park, in the county of Allegheny and State of Pennsylvania, have invented a new and useful Improvement in Electrolytic Cells, of which the following is a specification.

My invention relates to electrolytic cells such as condensers, lightning arresters, rectifiers and the like, and it has for its object to provide an improved electrode construction for cells of the character indicated whereby the space efficiency of the cell shall be as large as possible. This result is obtained, in general, by forming each electrode of a large number of separate elements of filming material, which may suitably be in the form of thin strips arranged in side-by-side relation and fastened together by means of clamping rods extending through the strips and carrying spacing members for maintaining the strips the proper distances apart.

Figure 1:
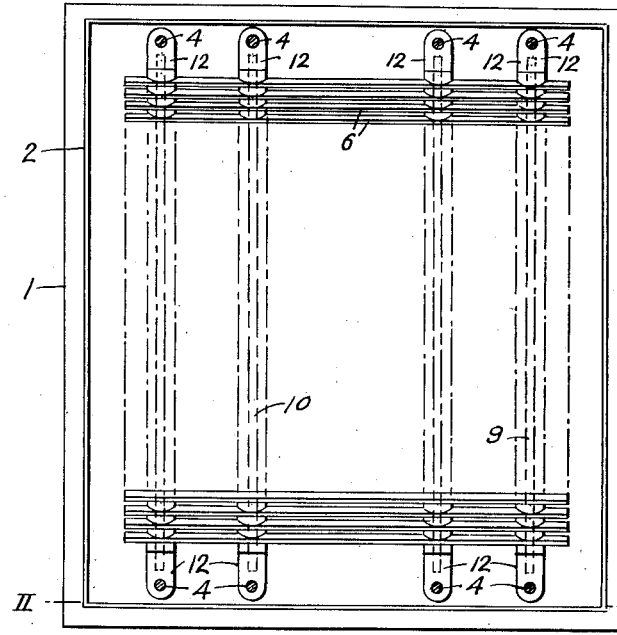
Figure 2:
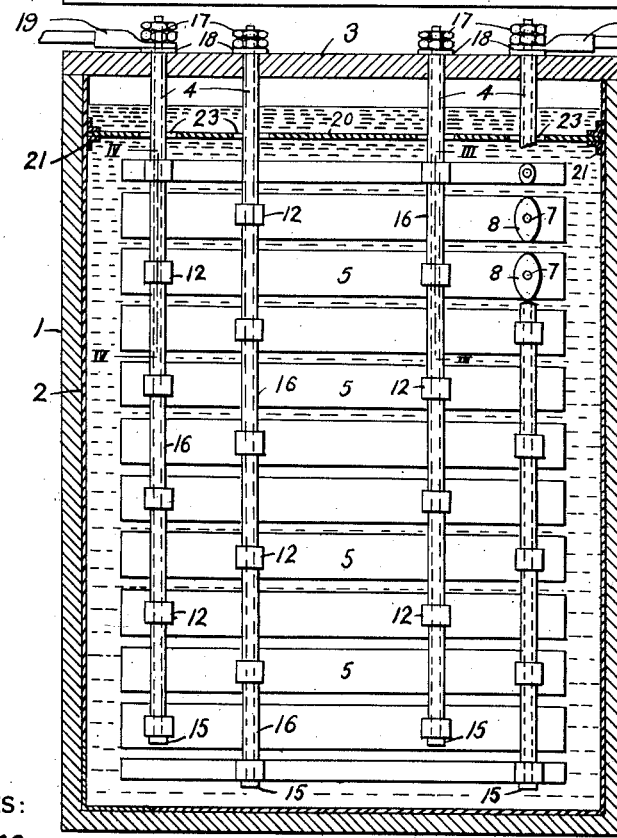
Figure 3:
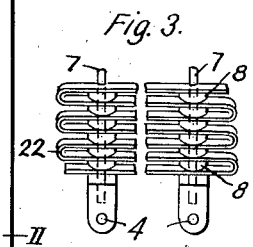
Figure 4:
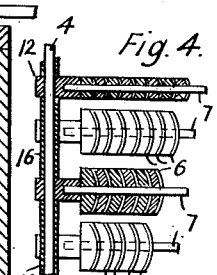
Figure 5:
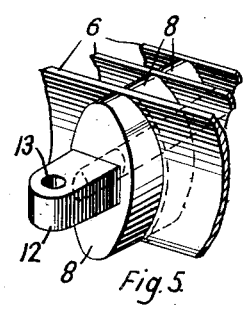

In the accompanying drawing, Figure 1 is a plan view, with parts shown in section and with the cover removed, of an electrolytic cell provided with electrode plates constructed in accordance with my invention. Fig. 2 is a side view, partially in elevation and partially in section, of the structure shown in Fig. 1, the section being taken substantially along the line II—II, Fig. 1. Fig. 3 is a fragmentary perspective view showing a modified form of electrode construction. Fig. 4 is a fragmentary vertical sectional view showing the construction of the individual electrodes composing the cell of Figs. 1 and 2 and their relation to one another, the spacers in certain of the electrodes being omitted for the sake of clearness, and the section being taken substantially along the line IV—IV, Fig. 2. Fig. 5 is a fragmentary perspective view showing one corner of an electrode constructed in accordance with my invention.

The cell shown in the drawing comprises a container 1 preferably provided with a lining 2 of aluminum or other filming or inert material and having a cover 3 from which is suspended, by means of vertical rods 4, a set of electrode plates 5 connected and supported in sets of alternate plates of opposite polarity. My present invention is particularly concerned with the construction of the electrode plates 5.

As best shown in Figs. 1, 4 and 5, each of the electrode plates 5 is made up of a considerable number of parallel strips 6 of aluminum, magnesium, tantalum or other filming material, the strips composing each electrode being fastened together by means of transverse rods 7 which extend through perforations in all of the strips and through spacing members 8 which are of such thickness as to maintain the several strips in properly spaced relation and which may suitably be of the oval form shown in Figs. 2 and 5 in order that they may offer as little resistance as possible to the passage of convection currents through the electrodes.

Each of the electrodes 5 may be provided with as many of the supporting rods 7 as are required to assemble the electrodes in rigid relation. I find that two such transverse rods are sufficient for electrodes of ordinary sizes, one of the rods being disposed near the ends of the strips, as shown at 9 in Fig. 1, and the other rod of the same electrode being disposed somewhat farther from the opposite ends of the strips, as shown at 10. Plates constructed in this manner are superposed, as shown in Fig. 1, the alternate plates being turned end for end, so that the transverse supporting rods associated with the electrodes of the same polarity are in vertical alinement and are displaced from the rods associated with the electrodes of the other polarity.

The ends of the supporting rods 7 are screw-threaded and the ends of each rod carry clamping nuts 12, which also serve as supporting lugs and are each provided with a transverse perforation 13 for receiving one of the vertical suspension rods 4. As shown, the strips 6 are longitudinally bent in order to increase their rigidity. The strips may, however, be flat or bent otherwise than in the manner shown, the spacers 8 being shaped to conform to the selected shape of the strips.

Each of the vertical suspension rods 4 extends, as indicated above, through the openings 13 formed in the correspondingly located members 12 associated with one set of plates of the same polarity. These rods are provided, at their lower ends, with flanges or nuts 15, upon which rest the lower plates of each set and the plates are properly spaced apart by means of spacing sleeves 16 which surround the rods 4 between the supporting members 12. The rods 4 extend through the cover 3 of the container and are provided with suitable nuts and washers 17 and 18 for securely fastening the rods to the cover of the cell. Terminal devices 19 are attached to two of the rods 4 belonging to sets of electrodes of opposite polarity.

It will be observed that the upper and lower electrodes are composed of strips of one-half the width of the strips composing the intermediate electrodes in order that the adjacent electrode surfaces may be electrically equal. Each of the intermediate electrodes coöperates with other electrodes both above and below it, while each of the extreme electrodes coöperate with one intermediate electrode only and therefore requires but one-half of the surface area of the intermediate electrodes.

By forming the electrodes at the ends of the series of substantially half the superficial area of the intermediate electrodes, uniform current conditions throughout the condenser are obtained. Furthermore, stray currents are avoided and any likelihood of the current seeking a metallic path between the end electrodes, such as otherwise sometimes occurs in electrolytic condensers where the container is of filming material or other metal, is prevented.

A splash-plate 20 is preferably disposed just above the upper electrode and may suitably consist of a sheet of aluminum in order that the electrolyte may engage nothing but film-forming material. As shown, the splash-plate 20 is carried by suitable supports 21 attached to the sides of the cell and is disposed below the surface 22 of the electrolyte, suitable openings 23 being provided for the supporting rods and the spacing sleeves. The arrangement of the splash-plate 20 below the surface of the electrolyte results in effective damping of the movements of the electrolyte which are produced when the cell is violently agitated and thereby reduces to a minimum the strains set up in the electrodes when the cells are subjected to the heavy service which is met with, for example, in electric locomotives.

A modified form of electrode, shown in Fig. 3 of the drawing, consists of a continuous strip 22, of aluminum or other filming material, wound back and forth in closely adjacent folds and supported upon transverse rods 7 as in the structures shown in the other figures of the drawing. This form of electrode may be manufactured very conveniently by perforating a ribbon of aluminum at the proper intervals to receive the rods 7 and forming such lengthwise bends in the ribbon as may be desired to increase its rigidity, and then winding the ribbon back and forth upon two or more of the rods 7, suitable spacers 8 being placed between the folds of the ribbon. If desired, the transverse rods 7 may be maintained in suitably spaced relation by means of crossbraces or the like.

While I have shown and described certain forms of electrode construction which I have found to be advantageous in actual service, both on account of simplicity of construction and effective utilization of the space available within the cell, it is to be understood that my invention is equally applicable to many other constructions which may be devised by persons skilled in the art to which my invention relates. I therefore desire that the structural details herein set forth be taken as illustrative only and not as imposing restrictions upon my invention, the scope of which is indicated in the appended claims.

I claim as my invention:

1. An electrode for electrolytic condensers, lightning arresters, rectifiers and the like comprising a plurality of longitudinally bent strips of filming material and clamping and spacing means, also of filming material, for holding the said strips together.

2. An electrode for electrolytic condensers, lightning arresters, rectifiers and the like comprising a plurality of longitudinally bent strips of aluminum and clamping and spacing means, also composed of aluminum, for holding the said strips together.

3. An electrode for electrolytic condensers, lightning arresters, rectifiers and the like comprising a plurality of transversely bent strips of aluminum disposed in parallel and side-by-side relation, aluminum spacing members disposed between the said strips and conforming to the shape thereof, a plurality of rods, each extending through the said strips and through one series of the said spacing members, a clamping nut screw-threaded upon one end of each of the said rods and a suspension member attached to the opposite end of each rod.

4. An electrolytic cell comprising a container, a plurality of suspension rods, a plurality of superposed electrodes, each of which comprises a plurality of side-by-side and longitudinally bent strips of filming material, spacing members of filming material disposed between the said strips, horizontal rods extending through the said strips and spacing members, a clamping nut screw-threaded upon one end of each of the said rods, the other end of each rod being attached to one of the said suspension rods.

5. An electrolytic cell comprising a plurality of adjacent electrodes severally composed of side-by-side elements composed of filming strip material, the strip material composing the end electrodes being of substantially one-half the width of the strip material composing the intermediate electrodes.

6. An electrolytic cell comprising a plurality of electrodes, alternate electrodes of which are connected to terminals of opposite polarity, the end electrodes each being of substantially one-half the superficial area of that of an intermediate electrode.

7. An electrolytic cell comprising a container of film-forming material, an electrolyte therein, and a plurality of electrodes of film-forming material disposed within the electrolyte, with alternate electrodes connected to terminals of opposite polarity, each outer electrode having a superficial area of substantially one-half of that of an intermediate electrode.

In testimony whereof I have hereunto subscribed my name this 3rd day of April, 1917.

LEWIS W. CHUBB.